United States Patent [19]

de Graaf

[11] Patent Number: 4,688,034
[45] Date of Patent: Aug. 18, 1987

[54] PAGING RECEIVER AND TRANSMITTING DEVICE ADAPTED TO SAID RECEIVER

[75] Inventor: Cornelis C. de Graaf, Emmen, Netherlands

[73] Assignee: Ericsson Paging Systems B.V., Emmen, Netherlands

[21] Appl. No.: 802,687

[22] Filed: Nov. 27, 1985

[30] Foreign Application Priority Data

Dec. 13, 1984 [NL] Netherlands .................. 8403787

[51] Int. Cl.⁴ .................................. H04B 7/00
[52] U.S. Cl. ........................ 340/825.48; 340/825.27
[58] Field of Search ............... 340/825.44, 825.48, 340/825.47, 825.27

[56] References Cited

U.S. PATENT DOCUMENTS 4,369,443 1/1983 Giallanza et al. ............ 340/825.44
4,477,804 10/1984 Nakajima et al. ............ 340/825.44

FOREIGN PATENT DOCUMENTS 2101779 1/1983 United Kingdom .
2149164 6/1985 United Kingdom .......... 340/825.44

Primary Examiner—Donald J. Yusko
Attorney, Agent, or Firm—Silverman, Cass, Singer & Winburn, Ltd.

[57] ABSTRACT

Paging system comprising a transmitter and one or more paging receivers, where said transmitter may transmit a communication comprising a first data block to all receivers. Each receiver comprises a first memory comprising up to five registers for storing therein component data blocks of said first data block, of which a second component representing a receiver address or select code in register, a third component, possibly composed of fifth and sixth subcomponents representing a message code and a message identification code in registers respectively, a fourth component representing a control code in register, and a seventh component representing an alternative message identification code in register 18. In a second memory of said receiver a plurality of third data blocks may be stored in a corresponding plurality of memory locations, the message code in which may be displayed and each of which may be erased if, depending on the value of the control code, the message code and/or the identification code thereof in first memory is identical to the corresponding contents of the location, which, in case of equality, may be written then with a new third data block, of which the message identification code may be the alternative message identification code.

6 Claims, 4 Drawing Figures

PAGING RECEIVER AND TRANSMITTING DEVICE ADAPTED TO SAID RECEIVER

BACKGROUND OF THE INVENTION

The invention relates to a paging receiver comprising a receiving circuit for the receiving and detecting of a first data block transmitted by a transmitting device, of which a second data block represents an address code for one or more receivers;

a first memory in which a received first data block is stored;

a first comparator which detects a first equality if the received address code is equal to an address code assigned to the receiver;

a second memory with two or more memory locations which are each suitable for the storing therein of a third data block of various first data blocks;

a first control circuit which, when the first equality occurs, scans locations of the second memory, compares by means of a second comparator the contents of corresponding sections of third data blocks which are present in the first memory and in the scanned location respectively, and alters the content of the scanned location depending on a second equality detected by the second comparator;

a second control circuit for the selection of a location of the second memory;

and an indicating element for the indication of a section of the third data block which is present in a location selected by the second control circuit.

A paging receiver of this type is known from British Pat. No. GB.2,101,779. In the known paging receiver the first, second and third data blocks are equal to each other and equal to the section of the third data block which is read out of the second memory and which can be displayed as a message on a window of the indicating element. On receipt of the data block the first control circuit will scan all the locations of the second memory and compare the content of each scanned location with the information content of the received data block. If an equality is detected in this process, the storage of the received data block in the second memory is prevented. If, after scanning all the locations, no equality is detected the oldest message present in the second memory is erased and the memory space which becomes available as a result of this is used for the storage of the newly received data block.

In the known paging receiver a newly received data block cannot be stored in a random location of the second memory. This is in particular troublesome if the oldest message recorded in the second memory contains more important information for the carrier of the paging receiver than the other messages recorded in the first and second memories. The importance of this drawback becomes particularly obvious in paging receiver systems with which emergency calls can be sent to service personnel such as in a nurse paging system.

Another important drawback of the known paging receiver is that a message no longer considered of importance by a user of the transmitting device is maintained in the second memory of the receiver so that the carrier of the receiver is inaccurately informed and may take an incorrect action.

The object of the invention is to eliminate the drawbacks of the known paging receiver.

SUMMARY OF THE INVENTION

For this purpose the invention provides a paging receiver of the known type named above, characterised in that the first memory is equipped for the storage of an additional fourth data block of the first data block, that the first control circuit determines the sections to be compared by the second comparator depending on the content of the fourth data block, and that the first control circuit erases the scanned location if the first and second equalities are present and depending on the content of the fourth data block.

If the transmitting device then transmits a suitable first data block to the paging receiver or paging receivers concerned, a location of the second memory will be selectively erased with it so that the message to the carrier of the receiver previously stored therein is cancelled. The erased location of the second memory can then be filled with another message which is transmitted by the transmitting device and which can have an arbitrary priority with respect to the other messages present in the second memory. In this process the carrier of the receiver will always be notified relevantly and with the most important information from the transmitting device.

Depending on the content of the additional fourth data block of the first data block, the second control can, on receipt of a new first data block, also proceed to replace the oldest third data block stored in the second memory by the new third data block. This can be used if prior to the transmission it is already known that the message of the oldest data block present in the second memory has the lowest priority or may be erased for other reasons. In this connection it is not necessary that the transmitting device first transmits a first data block for the erasing of the location concerned and then another first data block for filling the erased location with new information.

Each third data block can be divided into a fifth data block which represents a message to be displayed by means of the display element, and a sixth data block which represents an identification label assigned to the first data block. The sections of the third data block of the first memory and the third data block of a scanned location of the second memory to be compared by the second comparator may in this connection be formed by the fifth and/or the sixth data block. The choice of the clocks to be compared may be determined by the content of the fourth data block and may be made dependent on a certain degree of security against accidental erasure which may, for example, play a part in environments susceptible to interference.

The identification label may be a serial number or transmission time containing or not containing the relevant address code of the data block to be erased.

A beneficial embodiment of the paging receiver is one in which the first memory is equipped for the storage of an additional seventh data block of the first data block, the seventh data block being stored during the storage of the fifth data block of the scanned location as the sixth data block.

This achieves the purpose that a new message can be stored by means of a single transmission by the transmitting device in a location of the second memory selected to be erased by the transmitting device.

The invention also relates to a transmitting device suitable for combined operation with one or more paging receivers according to the invention provided with a control circuit having a buffer memory which is suitable for the storage therein of a first data block which can be transmitted by means of a transmitter connected to the control circuit, characterixed in that the control circuit is connected to a registration device which is suitable for the registration of transmitted first data blocks. By this means the operator of the transmitting device can choose an older message to be erased in the second memory of a receiver on the basis of the information stored by the registration device. The required priority may possibly be determined by the control circuit without intervention of the operator.

DETAILED DESCRIPTION OF PREFERRED EMBODIMENTS

Figure 1:
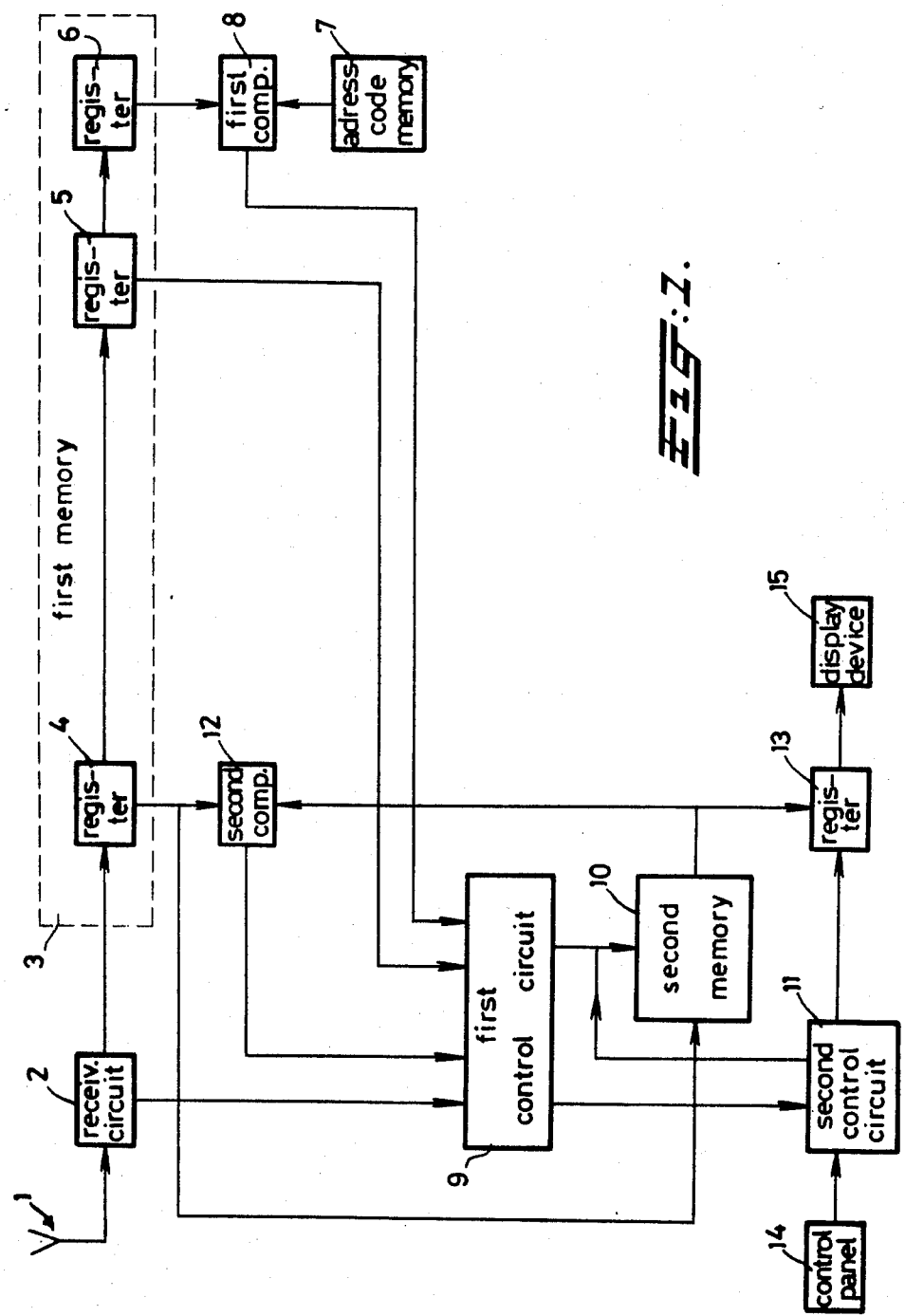
FIG. 1 shows a first embodiment of a paging receiver according to the invention.

The paging receiver shown in FIG. 1 comprises an aerial 1 and a receiving circuit 2 which receives a radio signal transmitted by a transmitting device and received by the aerial 1 and detects whether an information stream present in the radio signal may be intended for the paging receiver. The information stream for a paging receiver consists of a number of bits and will contain a number of control bits or check bits which the receiving circuit 2 has to detect. Depending on the detected values of the control and check bits the receiving circuit 2 allows the remainder of the information stream through or indicates after receipt of the entire information stream whether the latter has to be negated if the content does not correspond to a content intended for a paging device.

The binary information stream allowed through by the receiving circuit 2 is fed into a first or receiving memory 3. In the embodiment shown in FIG. 1 the first memory 3 consists of three shift registers 4, 5 and 6 rspectively in series. After the information stream has been received as a whole the memory 3 contains a first data block or transmission signal, of which the register 6 contains an address code signal portion, the register 5 a control code signal portion and the register 4 a message signal portion, the latter of which may be intended for the carrier of the paging receiver.

An address code memory 7 contains an address code assigned to the paging receiver which is compared by means of a comparator 8 with the address code signal portion present in the register 6. The comparator feeds an output signal corresponding to the comparison result to a first control circuit 9.

A second or message memory 10 has two or more memory locations which may be selected by the feeding of a suitable address to the message memory 10 from the first control circuit or, if enabled by the first control circuit 9, by a second control circuit 11.

Each location of the message memory 10 is suitable for the storing therein of the data present in a register 4. By suitable addressing of the message memory 10 the data of a selected location of the message memory 10 can be fed to a second comparator 12 and to a buffer register 13. An output of the comparator 12 is connected to an input of the first control circuit 9. Another input of the first control circuit 9 is connected to an output of the receiving circuit 2 for feeding to the control circuit 9 an output signal which indicates whether the received transmission signal may be intended for a paging receiver and has been received in its entirety.

The data control signal portion stored in the register 5 is fed via a suitable connection to the first control circuit 9.

A control panel 14 is connected to the second control circuit 11. The data stored in the buffer memory 13 are displayed on a read-out window of a display element 15. The capacity of the buffer memory 13 can contain more information than can be displayed by means of a suitable internal control of the buffer memory 13 or from the second control circuit 11, the information stored in the buffer memory 13 can therefore be displayed in sequential, possibly overlapping sections.

In a practical embodiment the message memory 10 may comprise 32 or more locations and the buffer memory 13 may contain information for 32 or more characters to be displayed with the display element 15.

On receipt of the control code signal portion in the register 5 with a first value, the first control circuit 9 will scan all the locations of the second memory 10 and erase each of the scanned locations.

On receipt of a control character signal portion with a second value in the register 5, the control circuit 9 will scan the locations of the message memory 10 until a free location is found into which the data message signal portion from the register 4 is then written. If no free location appears to be present, the control circuit 9 will erase the location written as the first of all the locations and fill it with data from the register 4 (so-called FIFO procedure).

If the control code signal portion in the register 5 has a third value, the control circuit 9 will scan the locations of the memory message 10 until the content of scanned location appears, by comparison using the comparator 12, to be equal to the content of the register 4, whereafter this location is erased. By means of a subsequent transmission by the transmitting device having a control code signal portion with a second value the said location can then be filled with data transmitted at the same time from the register 4.

Figure 2:
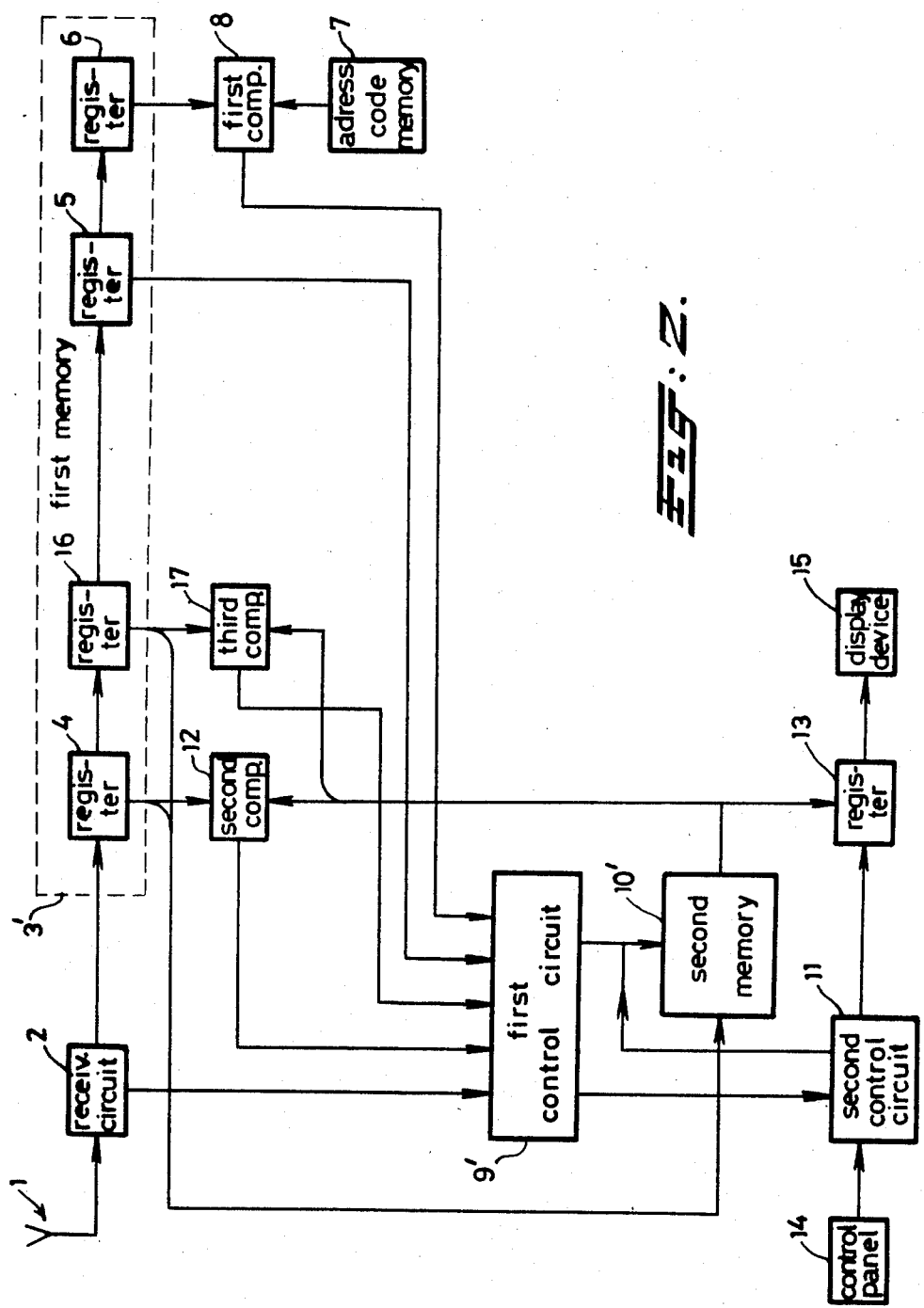
FIG. 2 shows a second embodiment of a paging receiver according to the invention.

In the embodiment of the paging receiver according to FIG. 2 the first memory 3 of the embodiment in FIG. 1 has been expanded with a register 16 into a first memory 3' which is connected to a third comparator 17. With good reception of a data block transmission signal in the first memory 3' the register 16 contains a message identification code signal portion or identification label which is assigned by the transmitting device to the message code signal portion stored in the register 4. The identification code signal portion may be made dependent on the address code of a paging receiver by the transmitting device. The identification code may take the form of a serial number of a number of communcations transmitted by the transmitting device and/or the transmission time of the communcation concerned.

Any location of the message memory 10' is suitable for the storing therein of a message code signal portion present in the register 4 and an associated identification code signal portion present in the register 16.

If the control code signal portion present in the register 5 has a fourth value, the first control circuit 9' will scan locations of the memory 10' until the identification code signal portion stored in a scanned location appears, by comparison by means of the third comparator 17, to be equal to the identification code signal portion present in the register 16. The said scanned location is then erased.

If the control code signal portion in the register 5 has a fifth value, the control circuit 9' scans locations of the memory 10' until the content of a scanned location appears, by means of comparison by the comparators 12 and 17, to be equal to the content of the registers 4 and 16. The said scanned location is then erased.

The first, second and third values of the control code signal portion for the embodiment in FIG. 1 have the same meanings in the embodiment in FIG. 2.

Figure 3:
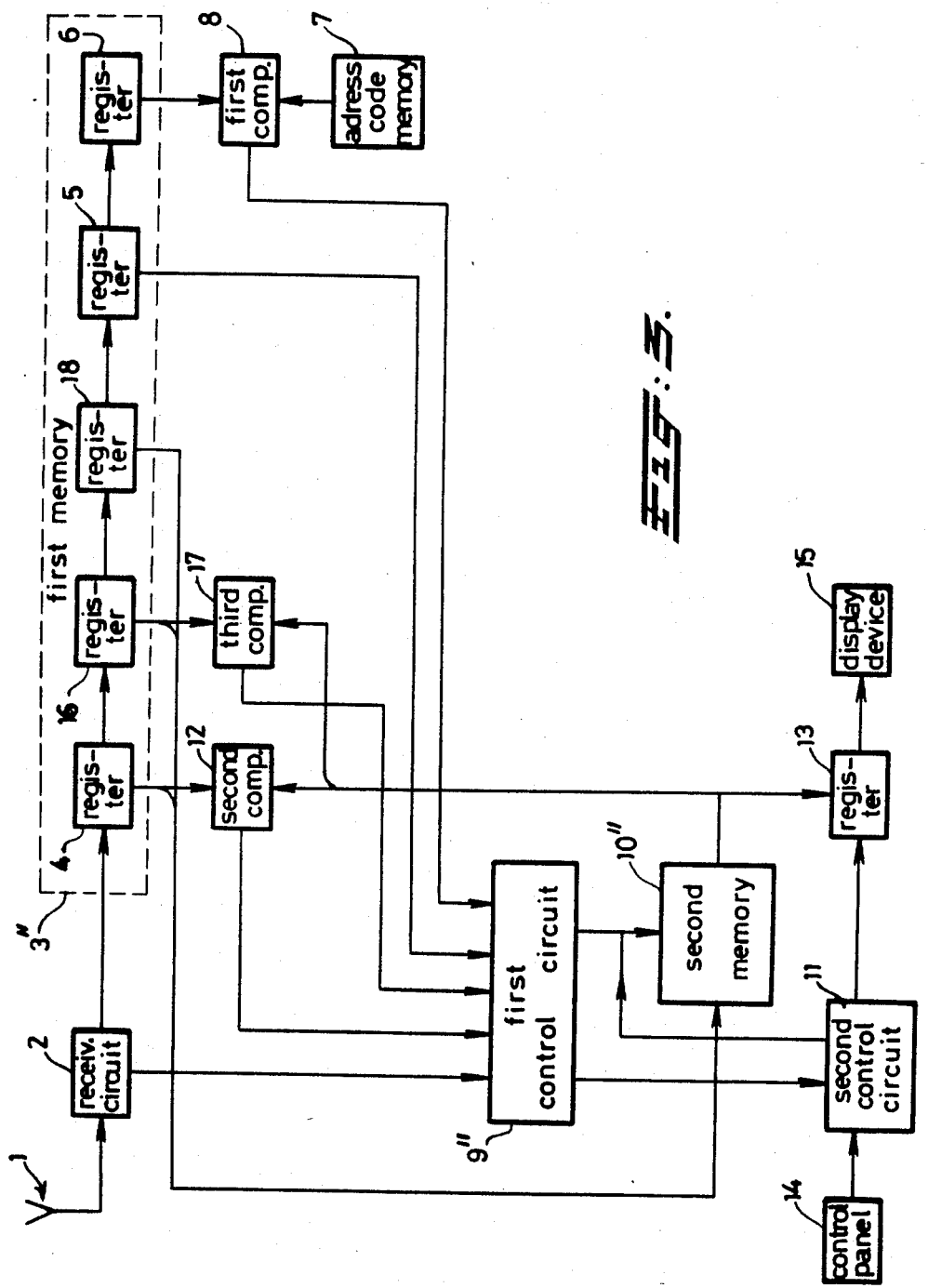
FIG. 3 shows a third embodiment of a paging receiver according to the invention.

The embodiment of a paging receiver shown in FIG. 3 has a first memory 3 which, in relation to the first memory 3' of the embodiment in FIG. 2, has been expanded by means of a register 18.

If the control code signal portion in the register 5 has a sixth value, the control circuit 9 will scan locations of the second memory 10'' until a scanned location appears, by means of comparison with the second comparator 17, to contain an identification code signal portion which is equal to an identification code signal portion present in the register 16. this location is then erased and filled with the message code signal portion present in the register 4 and the data present in the register 18 as the identification code signal portion associated with the message code present in the register 4.

By this means, by means of a single transmission of an information stream by the transmitting device, the location with a content having a certain priority is erased and filled with new information.

The values of the control codes signal portions which may be used for the embodiments in FIG. 1 and 2 can also be used for the embodiments in FIG. 3.

Figure 4:
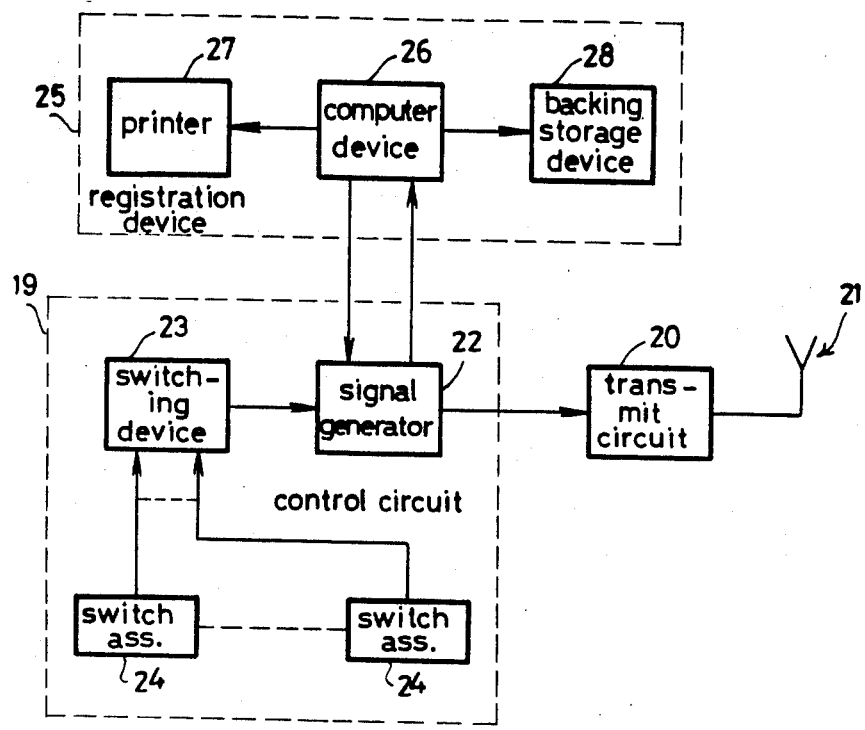
FIG. 4 shows a transmitting device suitable for combined operation with a paging receiver according to the invention.

FIG. 4 shows a block diagram of a transmitting device suitable for the transmission of signals to a paging receiver according to the invention, in particular according to the embodiments shown in FIGS. 1, 2 and 3.

The transmitting device comprises a control circuit 19, an output of which is connected to a transmitting circuit 20, an output of which is connected to a transmitting aerial 21.

The control circuit 19 comprises a signal generator 22 with a buffer memory which is suitable for the storage therein of a data block having a format such as that of the data block or transmission signal which can be stored in the first memory 3, 3', 3'' of a paging receiver. The information in the buffer memory is read out in series and converted into suitable signals, for example using phase shift modulation of the bits concerned. The transmitter 20 receives this signal and modulates it with a carrier wave frequency.

The buffer memory of the signal generator 22 is filled from a switching device 23 which may be a control panel and/or a section of a telephone exchange. A number of switching elements 24 are connected remotely to inputs of the switching devices 23. Each switching element 24 may comprise one or more switches and, for example, be installed in the vicinity of a patient who, by means of the operation of one of the switches, can cause the transmitting device to transmit a certain message to notify the nursing staff.

The signal generator 22 of the control circuit 19 is connected to a registration device 25 which can register the communications transmitted by the transmitting device.

The registration device 25 may consist of a computer device 26, an output of which is connected to a print 27 which can copy the transmitted communications and another output of which may be connected to a backing storage device 28. The computer device 26 may be equipped for the storage in the backing storage device 28 of the transmitted communications and for the erasure of the communications stored in the backing storage device 28 which have been transmitted by the transmitting device and which contain an erase command for a paging receiver. The computer device 26 can also be designed for the loading of the buffer memory of the signal generator 22 with the data which are dependent on data stored in the backing storage device 28 and for the subsequent transmission of the data from the buffer memory.

It is pointed out that the first memories 3, 3', and 3'' of the embodiments shown in FIGS. 1, 2 and 3 respectively of the paging receiver according to the invention may also be made up of registers or locations of a memory, the memory positions or bit locations of which are accessible in parallel. The receiving and message memories may form a single physical entity. In addition a number of components of the embodiments shown of the paging receiver according to the invention, in particular the memories, the registers, the comparators and the control circuits may be constructed on a single substrate and/or may be shared in a timedivisional process such as by a microprocessor.

What is claimed is:

1. A paging receiver for a paging system of which a transmitter transmits a transmission signal to the receiver, the transmission signal including an address signal portion, a message signal portion and a control signal portion, said receiver comprising:

receiving memory means having a plurality of registers for receiving said signal portions of the transmission signal;

address code memory means for storing at least one address code;

first comparator means for comparing the address signal portion with each address code stored in said address code memory means and supplying a first equality signal in case of equality;

message memory means hvaing two or more locations for storing therein respective message signal portions received with different transmission signals;

first control circuit means which, at the occurrence of the first equality signal, scans locations of said message memory means;

second comparator means for comparing the currently received message signal portion with the message signal portion contained in the contents of the location of said message memory means being currently scanned by said first control circuit means and supplying a second equality signal in case of equality;

second control circuit means for the selection of a location of the second memory for representing the contents of the message signal portion stored in said location on a display connected to said second control circuit means;

whereby, depending on the contents of the control signal portion, said first control circuit means erases said currently scanned location of said message memory means at the occurrence of the second equality signal or may store the currently received message signal portion in a selected location of said message memory means.

2. The paging receiver according to claim 1, wherein said first control circuit means include means for erasing all locations of said message memory means depending on the contents of the control signal portion.

3. A paging receiver for a paging system of which a transmitter transmits a transmission signal to the receiver, the transmission signal including an address signal portion, a message signal portion, a message identification signal portion, and a control signal portion, said receiver comprising:
   receiving memory means having a plurality of registers for receiving said signal portions of the transmission signal;
   address code memory means for storing at least one address code;
   first comparator means for comparing the address signal portion with each address code stored in said address code memory means and supplying a first equality signal in case of equality;
   message memory means having two or more locations for storing therein respective message signal portions received with different transmission signals;
   first control circuit means which, at the occurrence of the first equality signal, scans locations of the message memory;
   second comparator means for comparing the currently received message signal portion with the message signal portion contained in the contents of the location of said message memory means being currently scanned by said first control circuit means and supplying a second equality signal in case of equality;
   second control circuit means for the selection of a location of said second memory means for representing the contents of the message signal portion stored in said location on a display connected to said second control circuit means;
   third comparator means for comparing the currently received message identification signal portion with a previously received message identification signal portion being stored together with a co-pending previously received message signal portion in a location of said message memory means being currently scanned by said first control circuit means and for supplying a third equality signal at equality of the compared portions;
   whereby, depending on the contents of the control signal portion, said first control circuit means erases said currently scanned location of said message memory means at the occurrence of the second and/or third equality signal or may store in a selected location of said message memory means the message signal portion and message identification signal portion.

4. The paging receiver according to claim 3, wherein said first control circuit means include means for erasing all locations of said message memory means depending on the contents of the control signal portion.

5. A paging receiver for a paging system of which a transmitter transmits a transmission signal to the receiver, the transmission signal comprising an address signal portion, a message signal portion, a message identification signal portion, an alternative message identification signal portion and a control signal portion, the receiver comprising:
   receiving memory means having a plurality of registers for receiving said signal portions of the transmission signal;
   address code memory means for storing at least one address code;
   first comparator means for comparing the address signal portion with each address code stored in said address code memory means and supplying a first equality signal in case of equality;
   message memory means having two or more locations for storing therein respective message signal portions received with different transmission signals;
   first control circuit means which, at the occurrence of the first equality signal, scans loccations of said message memory means;
   second comparator means for comparing the currently received message signal portion with the message signal portion contained in the contents of the location of said message memory means being currently scanned by said first control circuit and supplying a second equality signal in case of equality;
   second control circuit means for the selection of a location of said message memory means for representing the contents of the message signal portion stored in said location on a display connected to said second control circuit means;
   third comparator means for comparing the currently received message identification signal portion with a previously received message identification signal portio being stored together with a co-pending previously received message signal portion in a location of said message memory means being currently scanned by said first control circuit means and for supplying a third equality signal of equality of the compared portions;
   whereby, depending on the contents of the control signal portion and the occurrence of the third equality signal the contents of the currently scanned location of said message memory means is replaced by the currently received message signal portion and the alternative message identification signal portion.

6. The paging receiver according to claim 5, wherein said first control circuit means include means for erasing all locations of said message memory means depending on the contents of the control signal portion.

* * * * *